(12) United States Patent
Tanaka et al.

(10) Patent No.: US 8,342,605 B2
(45) Date of Patent: Jan. 1, 2013

(54) VEHICLE SEAT LOCK DEVICE

(75) Inventors: Toshiyuki Tanaka, West Bloomfield, MI (US); Yasuhiro Kojima, West Bloomfield, MI (US); Nicholas DeMarco, Ferndale, MI (US); Timothy E. Fry, Allen Park, MI (US)

(73) Assignee: Aisin Technical Center of America, Inc., Plymouth, MI (US)

( * ) Notice: Subject to any disclaimer, the term of this patent is extended or adjusted under 35 U.S.C. 154(b) by 0 days.

(21) Appl. No.: 13/180,199

(22) Filed: Jul. 11, 2011

(65) Prior Publication Data

US 2012/0062015 A1    Mar. 15, 2012

Related U.S. Application Data

(63) Continuation of application No. 12/951,940, filed on Nov. 22, 2010, now abandoned.

(60) Provisional application No. 61/263,122, filed on Nov. 20, 2009, provisional application No. 61/263,118, filed on Nov. 20, 2009, provisional application No. 61/263,108, filed on Nov. 20, 2009.

(51) Int. Cl.
*B60N 2/42* (2006.01)

(52) U.S. Cl. ............ 297/378.13; 297/216.1; 297/216.13

(58) Field of Classification Search ............... 297/216.1, 297/216.13, 378.13
See application file for complete search history.

(56) References Cited

U.S. PATENT DOCUMENTS

| | | | |
|---|---|---|---|
| 5,730,480 A | 3/1998 | Takamura | |
| 6,945,585 B1 | 9/2005 | Liu et al. | |
| 7,152,926 B2 * | 12/2006 | Wrobel | 297/378.13 |
| 7,188,906 B2 * | 3/2007 | Christoffel et al. | 297/378.13 |
| 7,740,317 B2 * | 6/2010 | Yamada et al. | 297/378.13 |
| 2010/0052394 A1 * | 3/2010 | Heeg et al. | 297/378.13 |
| 2010/0102614 A1 * | 4/2010 | Kreuels et al. | 297/378.13 |

* cited by examiner

*Primary Examiner* — Sarah B McPartlin (74) *Attorney, Agent, or Firm* — Oblon, Spivak, McClelland, Maier & Neustadt, L.L.P.

(57) ABSTRACT

A vehicle seat lock device is provided. The vehicle seat lock device includes a seat lock housing, a striker, a hook member and a blocking member. The seat lock housing is configured to be fixed to one of a seat back and a vehicle body. The striker is configured to be fixed to the other of the seat back and the vehicle body. The hook member is rotatably mounted on the seat lock housing to latch and unlatch the striker by engaging and disengaging the striker, respectively. The blocking member is pivotally mounted on the seat lock housing. The blocking member pivots and contacts with the hook member to prevent the hook member from rotating and to maintain engagement between the hook member and the striker when a load that is higher than a predetermined amount is inputted to the vehicle body.

14 Claims, 9 Drawing Sheets

VEHICLE SEAT LOCK DEVICE

CROSS REFERENCE TO RELATED APPLICATIONS

The present application is a continuation of application Ser. No. 12/951,940, filed on Nov. 22, 2010, which is entitled to benefit of, under 35 U.S.C. §119(e), U.S. provisional applications Ser. Nos. 61/263,108, 61/263,118 and 61/263,122 filed on Nov. 20, 2009, the entire contents of which are incorporated herein by reference.

BACKGROUND OF THE INVENTION

1. Field of the Invention

The present disclosure relates to a lock device for a vehicle retractable seat whose seat back is able to be secured to and released from a vehicle body selectively. In particular, this technology relates to a locking mechanism for locking between a member connected to a vehicle body and a member connected to a seat back when a dynamic force, which is greater than a holding force by a latch mechanism in ordinary use by user, is inputted to the vehicle body.

2. Description of Related Art

A vehicle seat attachment latch assembly is disclosed in, for example, U.S. Pat. No. 6,945,585. This latch assembly includes a latch mounted for movement between latched and unlatched positions with respect to a striker to secure and selectively release a vehicle seat with respect to a vehicle body. A latching wedge is mounted on the latch for movement therewith and for movement with respect thereto in cooperation with a bias provided by a first spring that moves a wedging surface of the latching wedge into wedging contact with the striker with the latch in its latched position in order to provide a rattle free attachment. A locking pawl and a spring cooperate to hold the latch in its latched position or permit release thereof for movement to the unlatched position where the striker is released. That is to say, the latch (member) engages with locking pawl every time when the latch member latches or holds the striker, in ordinary use by user.

As described above, according to the latch assembly in U.S. Pat. No. 6,945,585, to eliminate play between the latch member and the striker which causes a rattle, has an additional latching wedge and the bias (spring) on the latch member, for purpose of holding the striker being tightly with the latch member when the striker is positioned at a latched position. Thus, this structure requires additional members, to add a locking function/mechanism into a latching function/mechanism.

Meanwhile, U.S. Pat. No. 5,730,480 discloses a lock device for a retractable automotive seat that includes a base member having a striker receiving slot into which the striker can be led. A latch plate is pivotally connected to the base member. A locking plate is pivotally connected to the base member. A striker restraining member is pivotally connected through a pivot shaft to the base member. The striker restraining member is pivotal between a restraining position, where a contact edge thereof abuts against the striker, and a releasing position, where the contact edge disengages from the striker. Springs are employed for biasing the latch plate to pivot toward a stand-by position, biasing the locking plate to pivot toward a lock position, and biasing the striker restraining member to pivot toward the restraining position. A link mechanism is employed for causing the striker restraining member to take the restraining position when the latch plate and the locking plate take latching and lock positions respectively. The pivot shaft of the striker restraining member is positioned at the back of the striker receiving slot, so that the contact edge of the striker restraining member can abut against a front side of the striker. In other words, a locking mechanism including the locking plate, the latch plate and so forth is sandwiched by the base member and another plate.

As described above, according to the lock device in U.S. Pat. No. 5,730,480, as in FIG. 2 two plate members sandwich a locking structure/mechanism such as the locking plate, the latch plate and so forth.

SUMMARY OF THE INVENTION

According to one aspect of the present disclosure, the vehicle seat lock device includes a seat lock housing, a striker, a hook member, and a blocking member. The seat lock housing is fixed to or configured to be fixed to one of a seat back or a vehicle body and the striker is fixed to or applied to be fixed to the other one of the seat back or the vehicle body. Furthermore, the hook member is rotatably mounted on the seat lock housing for latching and unlatching the striker by engaging and disengaging the striker, and the blocking member is pivotally mounted on the seat lock housing, so that the blocking member is able to pivot and contact with the hook member for preventing the hook member from its rotation, to keep the engagement between the hook member and the striker while higher load than predetermined is inputted to the vehicle body.

In this exemplary aspect, the hook member is able to be integrally formed with the wedge portion that latches and holds the striker with the holding force, in the latched position, since the hook member does not contact with the block member while latching and unlatching the striker as an ordinary operation. This holding force is able to work in the opposite direction to the direction in which the striker moves to unlatched position, for purpose of eliminating the play and the rattle between the wedge portion of the hook member and the striker. By adjusting the angle of the wedge portion, the hook member is able to keep the engagement between the hook member and the striker properly in the latched position, while the load applied to the hook member and the striker is the predetermined range which corresponds to ordinary use force amount by a passenger such as seating, lean over and hanging something. Meanwhile, when higher or dynamic load, caused from i.e. vehicle collision or unexpected braking acceleration, is inputted or generated at vehicle body and then transmitted to the seat lock device, the hook member can be rotated to unlatch the striker due to the higher load than predetermined. However, in this configuration, the block member pivots to contact with the hook member so as to stop rotating as locking. In this way, with a fewer components structure, the block member is able to maintain the engagement of the hook member and the striker, namely a latched state.

According to another aspect of the present invention, the vehicle seat lock device includes the base plate fixed to or configured to be fixed to one of a seat back or a vehicle body, and the deformable striker pin fixed to the base plate and engaging in a hole provided with the other one of the seat back or the vehicle body in predetermined clearance. With this structure, while higher load than predetermined is inputted to the vehicle body, the deformable striker pin contacts with the hole and transmits the load which is inputted in the vehicle body, from the vehicle body to the seat back.

In this example, the latch and lock mechanism is made and mounted on only the base plate, and the deformable striker pin works as the striker for the latch mechanism and as energy absorbing and transmission member for the lock mechanism.

That is to say, with the fewer components, the light weight and effective latch and lock mechanism is provided.

BRIEF DESCRIPTION OF THE DRAWINGS

A more complete appreciation of the invention and many of the attendant advantages thereof will be readily obtained as the same becomes better understood by reference to the following detailed description when considered in connection with the accompanying drawings, wherein.

DETAILED DESCRIPTION OF THE PREFERRED EMBODIMENTS

Referring now to the drawings, wherein like reference numerals designate identical or corresponding parts throughout the several views.

Embodiments of a vehicle seat lock device 1 for a seat of an automotive vehicle will be described hereinafter with reference to attached FIGS. 1 to 9. Herein, the vehicle seat lock device 1 is mounted on a seat back 3 of a rear seat 2 in the automotive vehicle. The first embodiment is explained with reference to FIG. 1 through FIG. 5.

Figure 1:
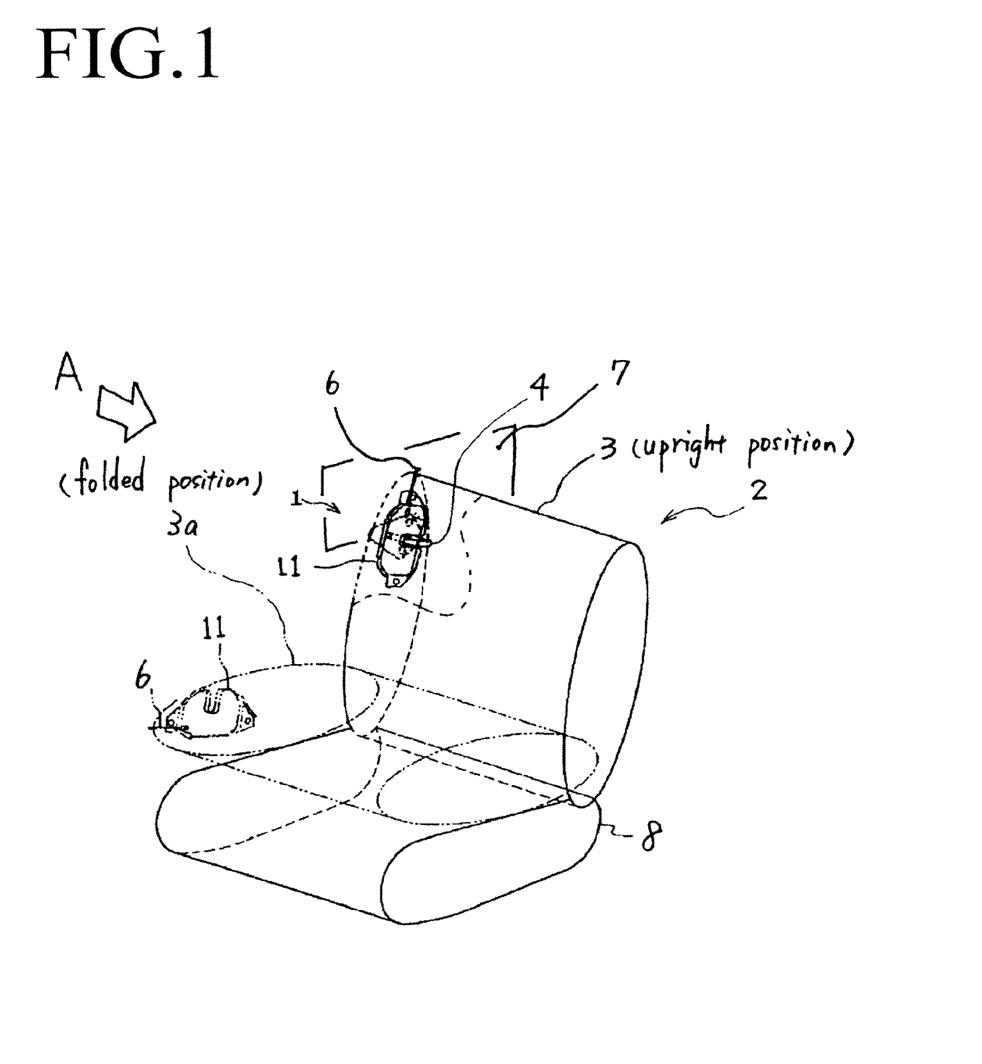
FIG. 1 is a perspective view illustrating a vehicle seat lock device and a seat assembled with the seat lock device, according to one embodiment.

FIG. 1 illustrates the vehicle seat lock device 1 for the seat 2 in the automotive vehicle (hereinafter, referred to also as seat lock device 1). According to the first embodiment, the lock device 1 includes a seat lock housing 11 and a striker 4. The seat lock housing 11 is mounted to a side surface of the seat back 3 of the retractable seat 2. The striker 4 is mounted to a side surface of a vehicle body 7 at a position corresponding to the seat lock housing 11 in a state where the seat back 3 is in an upright position (illustrated in continuous lines). This state, where the seat back 3 is secured to the side surface of the vehicle body 7, is termed the "latched state."

The latched state of the vehicle seat lock device 1 is changed to an unlatched state 3a (shown in dotted lines) by pulling a wire 6 which is assembled to the seat lock device 1, thereby causing the seat back 3 of the seat 2 to fold towards a seat cushion 8. In FIG. 1, the folded seat back 3a, the seat lock housing 11 mounted to the seat back 3a and the wire 6 (i.e., a unlatched state of the lock device 1) are indicated by dotted lines. A is readily apparent to one of ordinary skill in the art, although not illustrated in the drawings, the seat lock housing 11 of the vehicle lock device 1 is able to be mounted on the vehicle body 7, while striker 4 can be mounted on the side surface of a seat back 3.

Figure 2:
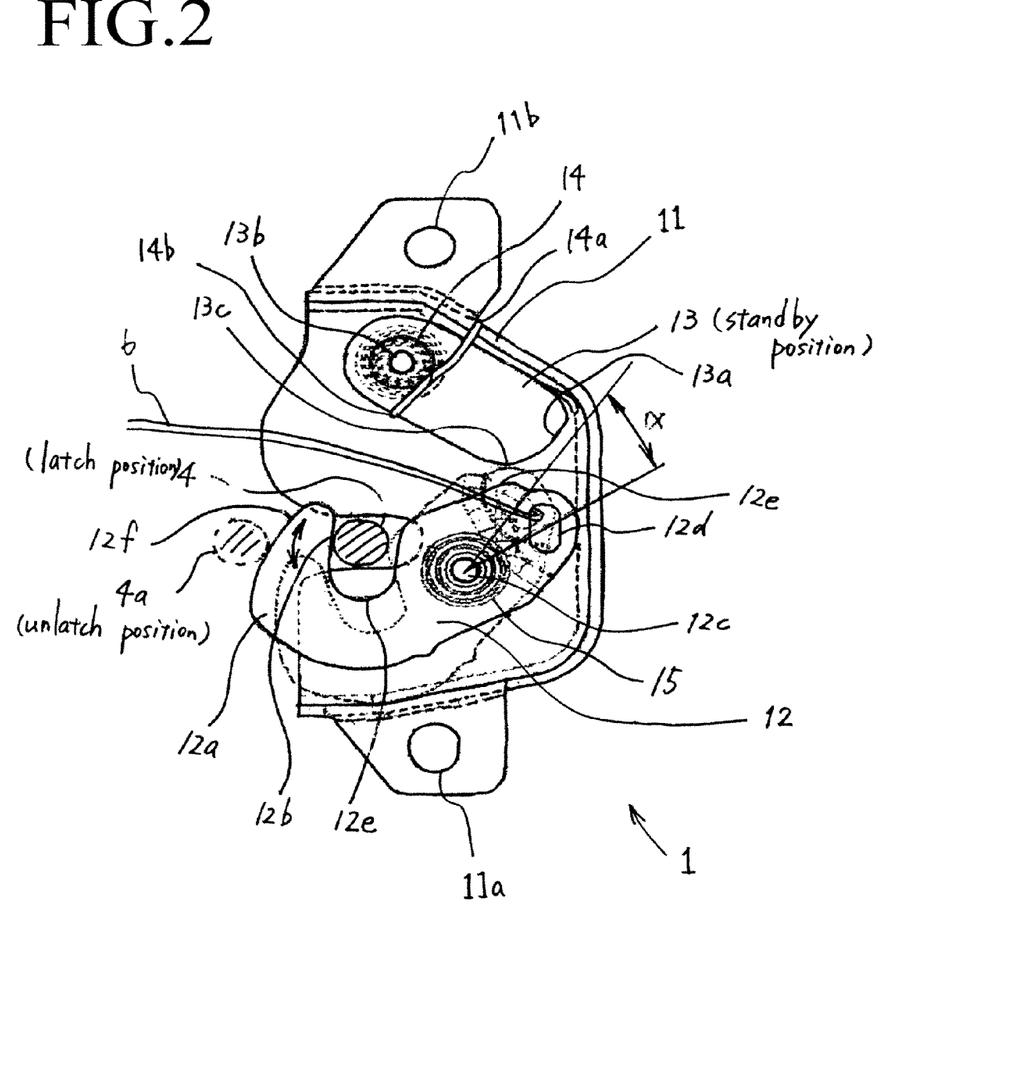
FIG. 2 is a perspective view illustrating the seat lock device seen from direction "A" in FIG. 1.

FIG. 2 is a view from direction "A" in FIG. 1. The seat lock device 1 includes, in the seat lock housing 11, a hook member 12, a block member 13 and the striker 4 which is fixed on the vehicle body 7. The seat lock housing 11 has a hole 11a and a hole 11b at upper and bottom flanges, and is mounted on the side of the seat back 3 via these holes 11a, 11b.

The hook member 12 is integrally formed with an engagement portion 12a at one end and a slit hole 12d on an opposite end. The engagement portion 12a is formed by a incline portion 12f that mates with the striker 4, a wedge portion 12b that engages with the striker 4 and a dent portion 12 that is able to hook and hold the striker 4 in the latched state. When the striker 4 moves from the unlatched position to a latched position, the striker 4 makes contact with the incline portion 12f of hook member 12, and this contact causes the hook member 12 to rotate counter-clockwise, due to a tapered shape of the incline portion 12f. The striker 4 then enters into the dent portion 12e. Once this occurs, the hook member 12 rotates clockwise back in to the latched position. A rotation axis member 12c of the hook member 12 is located between the engagement portion 12a and the slit hole 12d, so that the hook member 12 is rotatable about the rotation axis, the rotational pin 12c. A spiral spring 15 is disposed around the rotational axis member, rotational pin 12c. The spiral spring 15 biases the hook member 12 in the direction toward the latched state, namely clockwise direction, by its torsional spring force. A user's operational load transmitted from handle leveler (not shown) to the slit hole 12d via the wire 6 rotates the hook member 12 in the direction toward the unlatched state, namely counter-clockwise direction. In this way, under an ordinary operation by a user, the seat lock device 1 latches and unlatches, engages and disengages with the striker 4 at an angle range a of the hook member 12 rotation.

The block member 13 has a pendulum shape. One end of the block member 13 has a contact portion 13a, and the opposite end has a pivot axis 13b. A torsion spring, which acts as a bias spring 14 is disposed at the pivot axis member, the pivot pin 13b. One end 14a of the bias spring 14 is hooked on the seat lock housing 11, and the other end 14b is hooked on the block member 13. The torsional force of the bias spring 14 biases the block member 13 to a standby position shown in FIG. 2, namely counter-clockwise, where the block member 13 has no contact with the hook member 12 during either latched or unlatched states during ordinary operation of the hook member 12, which corresponds to a state that a static or a quasi static load inputted to the vehicle body 7. That is to say, the hook member 12 is able to be integrally formed with the wedge portion 12b that latches and holds the striker 4 with the holding force, in the latched position, since the hook member 12 does not contact with the block member 13 while latching and unlatching the striker 4 during an ordinary operation.

This holding force of the hook member 12 in the latched state is able to work in the opposite direction to the direction in which the striker moves 4 to unlatched position, for the purpose of eliminating the play and the rattle between the wedge portion 12b of the hook member 12 and the striker 4. By adjusting the angle of the wedge portion 12b, the hook member 13 is able to keep the engagement between the hook member 12 and the striker 4 properly in the latched position. The load applied to the hook member 12 and the striker 4 is a predetermined range which corresponds to an ordinary force amount used by a passenger due to as sitting, lean over and hanging something.

Figure 3:
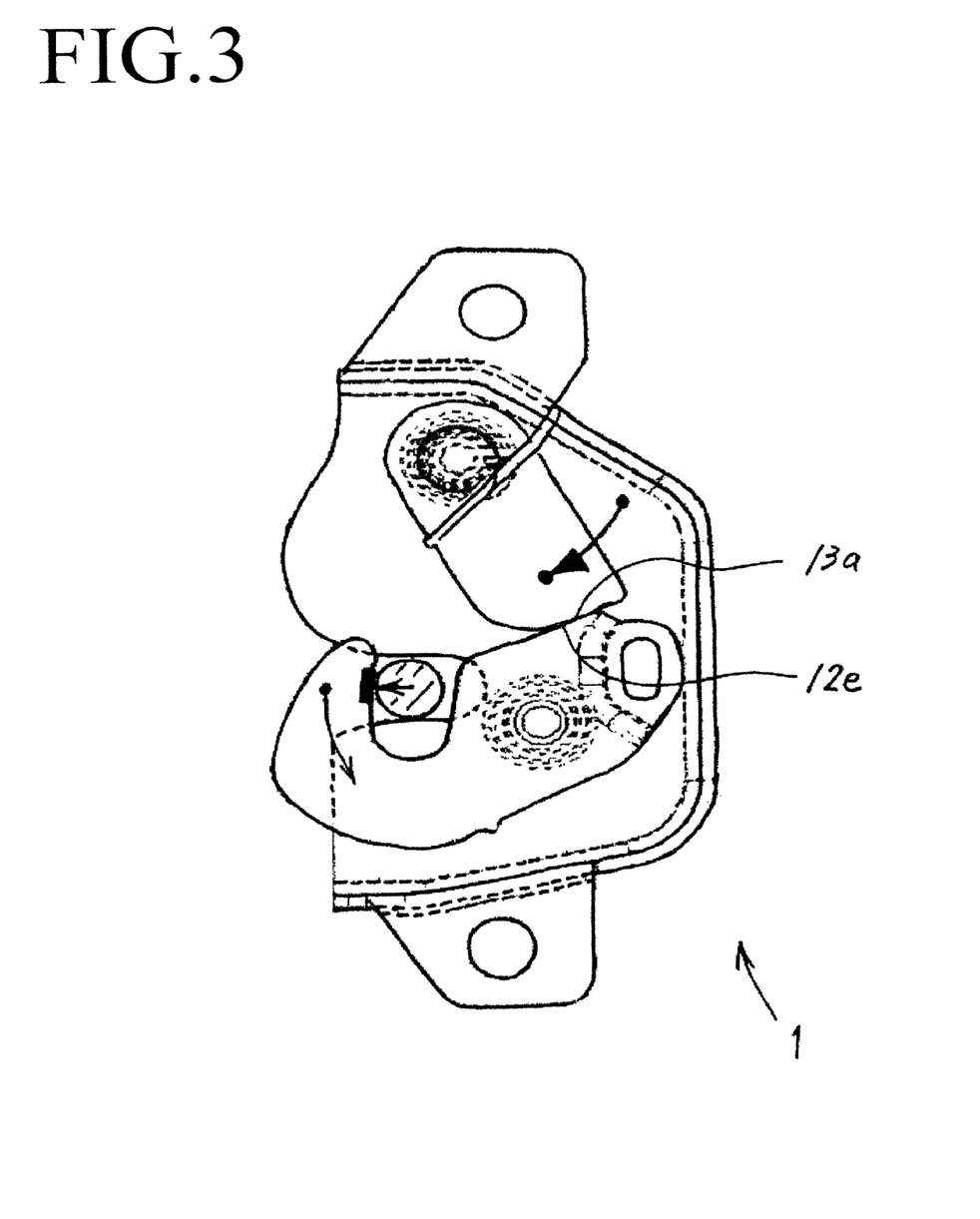
FIG. 3 is a perspective view illustrating the seat lock device in working state.

In FIG. 3, the seat lock device 1 is in working state where a higher load than the predetermined range is input to vehicle body 7, namely higher acceleration than predetermined happens. This high loading happens or is caused by, for example, a vehicle collision or a severe acceleration change. During such loading, the striker 4, that is fixed to the vehicle body 7, would move toward the unlatched position 4a relative to the seat lock housing 11, which is fixed to the seat back 3, since the vehicle body 7 reacts more quickly than the vehicle seat 2 and a passenger relatively, in response to such a dynamic load. Also, at the moment of the high loading, the block member 13 starts to rotate counter-clockwise due to inertia force of the block member 13. In particular, the torsional force of the bias spring 14 is less than the inertial force generated during the dynamic force input situation.

The weight of the blocking member 13 is designed so that enough inertial force is generated to cause the blocking member 13 to rotate clockwise during the high loading. Thus, as the hook member 12 rotates counter-clockwise during high loading due to a tapered shape of the wedge portion 12b, the blocking member 13 rotates clockwise so as to make contact with the hook member 12. Specifically, the contact portion 13a of the block member 13 contacts the stopper portion 12e of the hook member 12. A portion of the contact portion 13a that is close to the hook member 12 is formed in round chamfer shape 13c in order to create smooth contact therebetween and prevent unstable contact.

Figure 4:
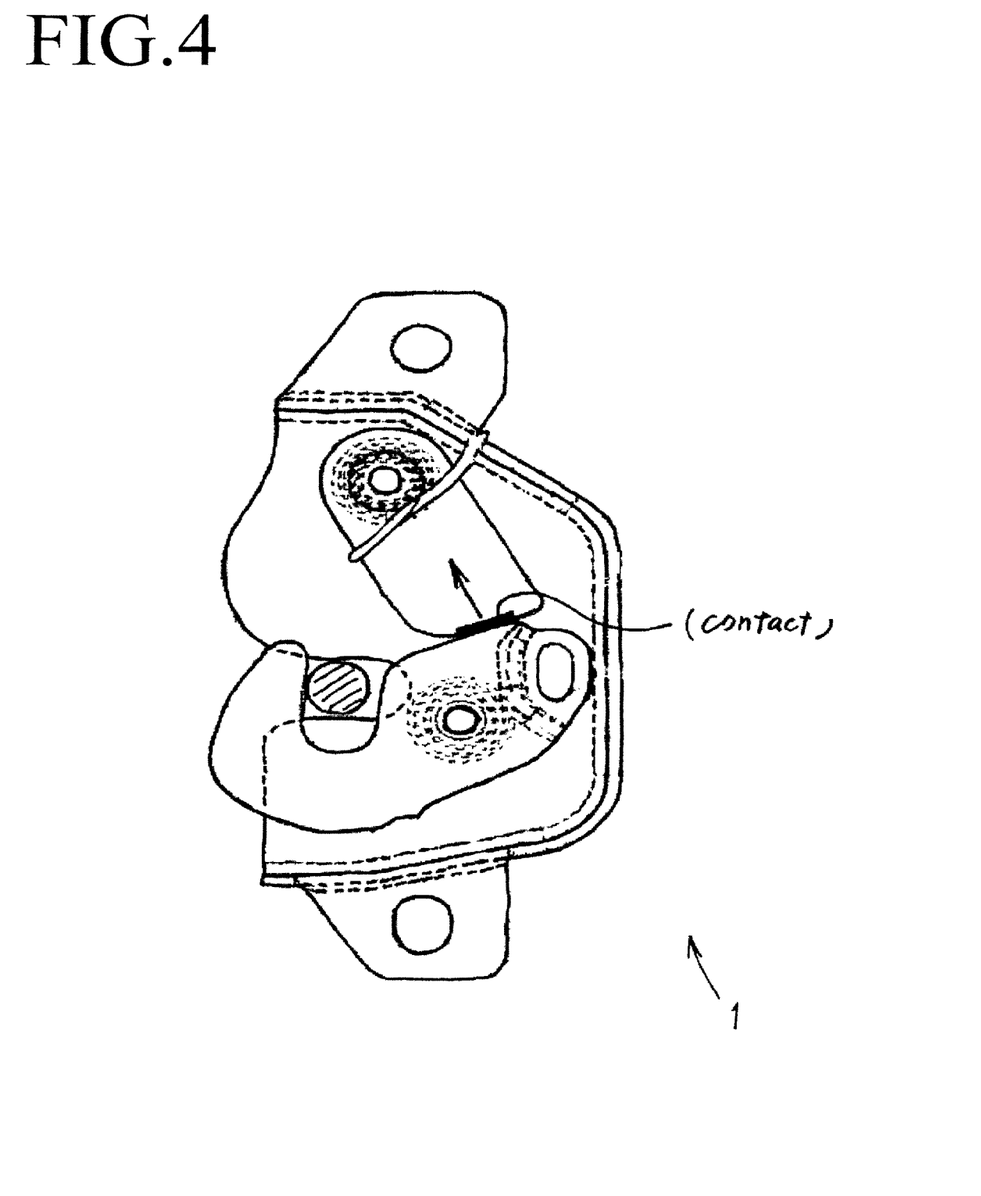
FIG. 4 is a perspective view illustrating the seat lock device in lock state.

FIG. 4 shows the seat lock device 1 in a locked state in which the hook member 12 fully contacts the block member 13. Due to a reactive force from the block member 13, like working as a prop member, the hook member 12 can not rotate counter clockwise any more. In this way, the striker 4 is fully locked at the latched position, namely "locked state". This means, despite high loading inputted to the vehicle body 7, the seat lock device 1 can keep the seat back 3 in the upright position securely. In other words, the seat lock device 1 can prevent the seat back 3 from being folded unexpectedly even when there is a tool box or heavy stuff behind the seat, and serves as a secure seat lock device with fewer relatively fewer components.

Figure 5:
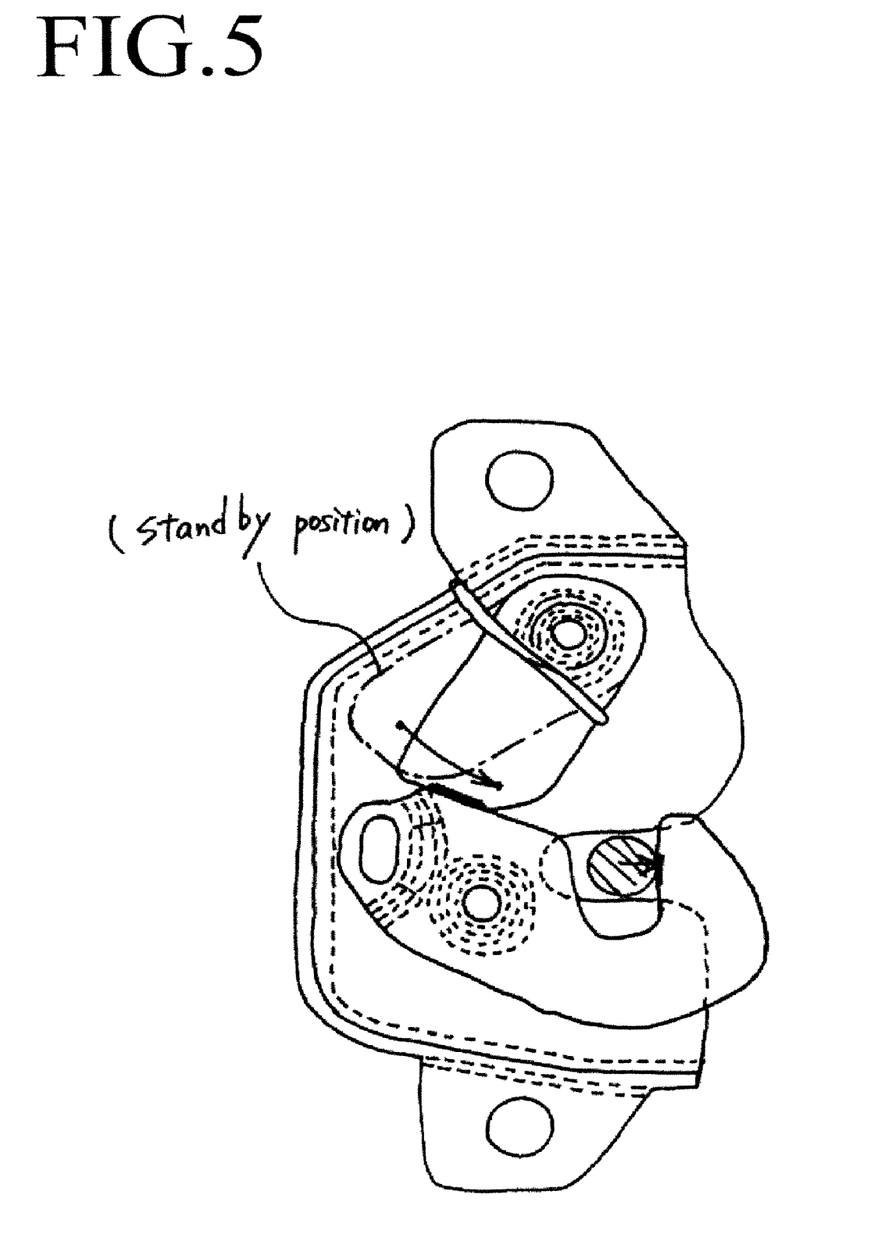
FIG. 5 is a perspective view illustrating the symmetrical device of the seat lock device.

FIG. 5 illustrates a device that is a symmetrical version of the seat lock device 1 described above. When a high loading happens at the vehicle body, the block member illustrated in FIG. 5 rotates counter-clockwise so as to contact with the hook member.

The second embodiment will now be described with reference to FIG. 6 through FIG. 9. In the second embodiment, a pivot pin 31 and a rotational pin 32 are explained in detail. These pins correspond to the pivot pin 13b and the rotational pin 12c in the first embodiments. In this second embodiment, a bracket 22 is attached to a vehicle body 21 but the bracket 22 can be attached to a side of seat back, in this invention scope.

Figure 6:
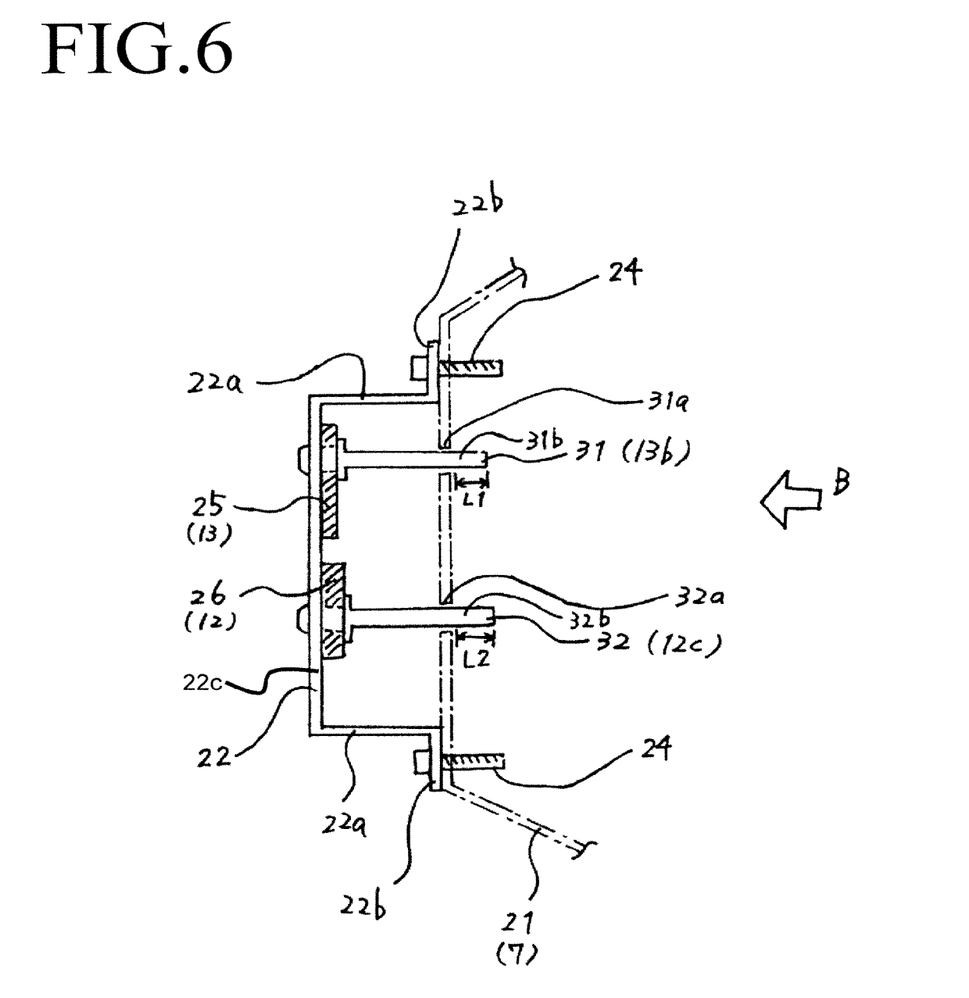
FIG. 6 is a side view illustrating the lock device of a second embodiment.
Figure 7:
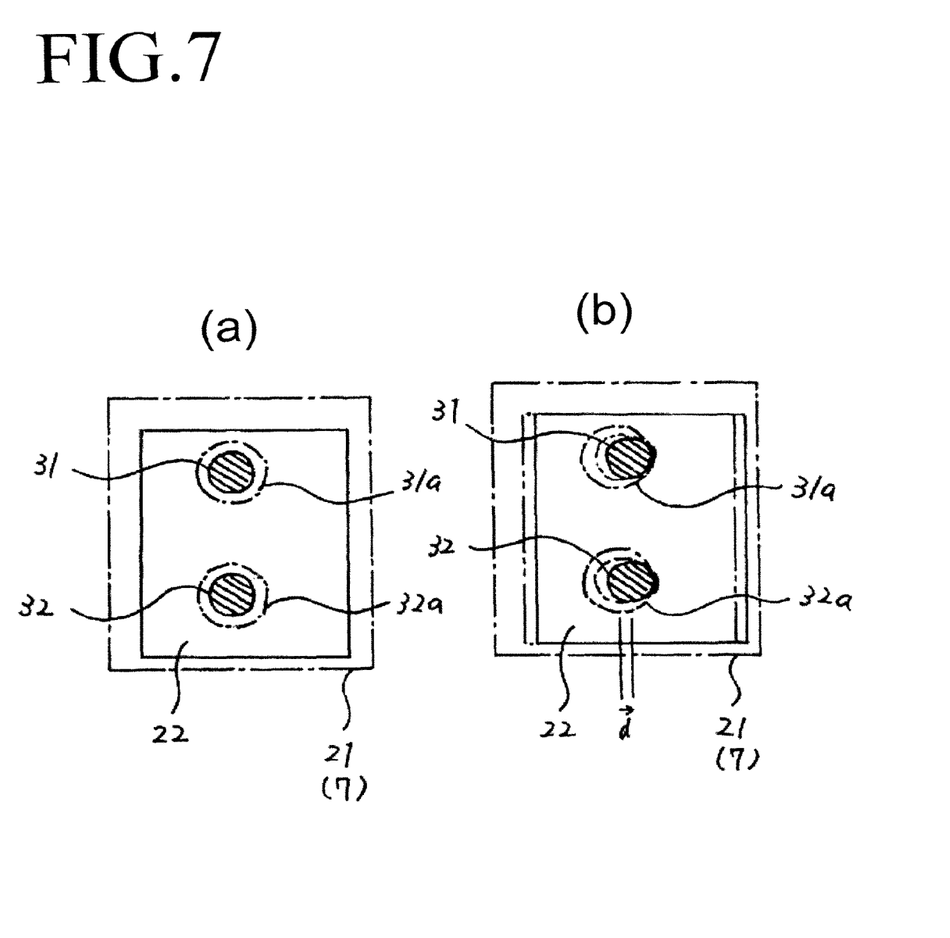
FIG. 7 is a plane view illustrating the lock device, ordinary use state and working state, seen from direction "B" in FIG. 6.

In FIG. 6, the U-shaped bracket 22 has a plainer shape base plate 22c and leg portions 22a which are mounted to the vehicle body 21 at a distance of a length of the leg portions 22a. By means of bolts 24 and flanges 22b of the bracket 22, the base plate is fixed to the vehicle body 21 rigidly. The pins 31,32 are anchored at the base plate 22c with holding an upper link 25 which corresponds to the block member 13 and a lower link 26 which corresponds to the hook member 12, and each pin 31, 32 is spaced apart from each other. On the surface of the vehicle body 21 corresponding to the locations where the two pins 31, 32 are positioned, receptacle holes 31a, 32a are formed. These receptacle holes 31a, 32a have a greater diameter bore than the diameter of the pins 31, 32 at predetermined clearance "d", and the pins 31, 32 penetrate at L1 and L2 amount in longitudinal direction at penetration portions 31b, 32b. In view of this concept, that the length of L1, L2 is different or same is acceptable.

FIG. 7(a) is a plane view from the "B" direction in FIG. 6, and shows an ordinary state in use. FIG. 7(b) is the same view in a high loading or dynamic load inputted state. In FIG. 7(a), there are predetermined clearances between the pins 31, 32 and the receptacle holes 28. In FIG. 7(b), as mentioned above, due to dynamic load or severe acceleration change, the base plate 22c and the pins 31, 32 deform a distance of "d" until the pins 31, 32 contact with the receptacle holes 31a, and 32a. That is to say, the dynamic force transmitted from the vehicle body 21 to the pins 31, 32 is reduced by absorbing effect of these deformations. In this way, peak value of a dynamic force and shear force inputted to the pins 31, 32 is lowered with a fewer components structure.

Figure 8:
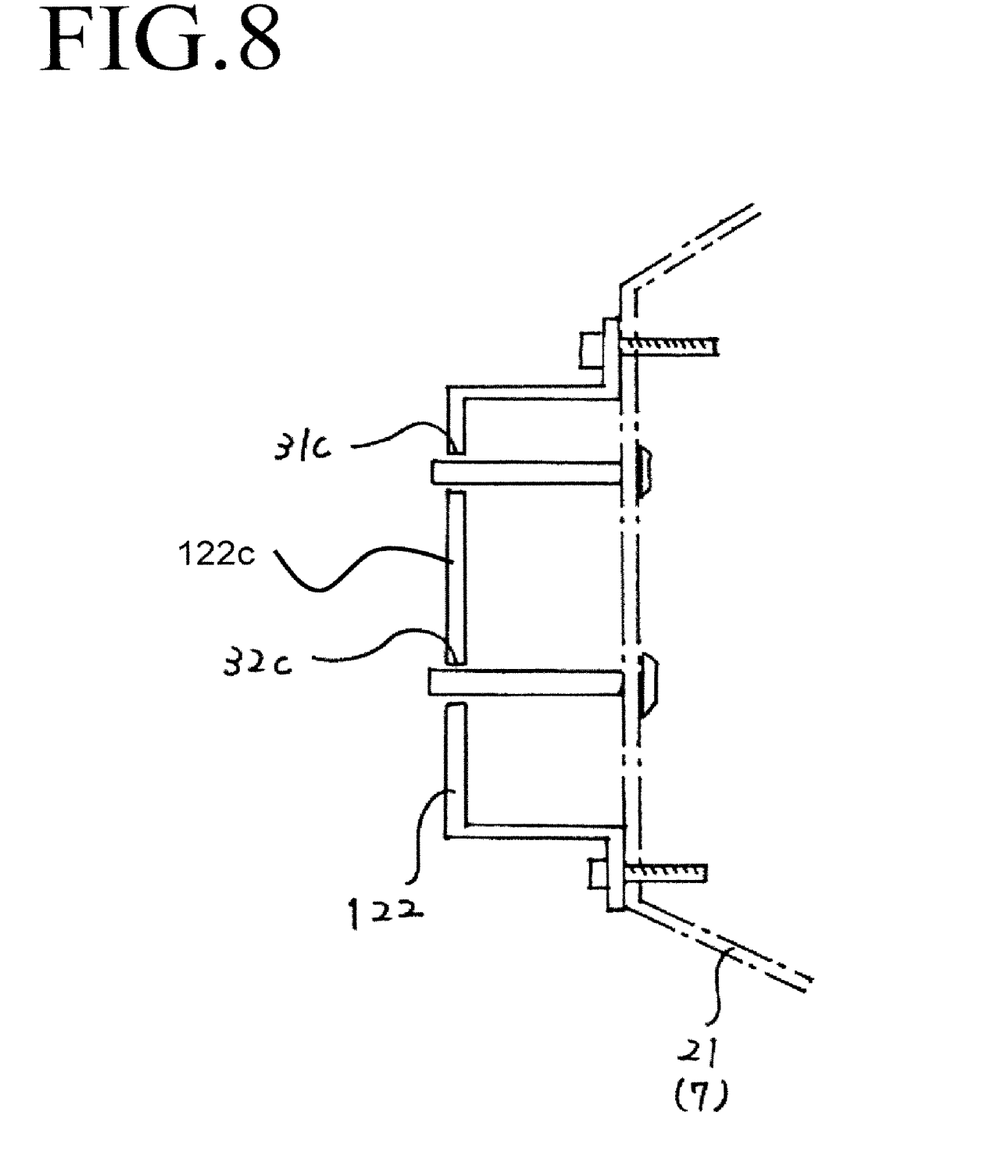
FIG. 8 is a side view illustrating the lock device of another example of the second embodiment.

In FIG. 8, the pins 31, 32 are fixed to the vehicle body 21 while the receptacle holes 31c and 32c are formed at the base plate 122. This is another example of the second embodiment.

Figure 9:
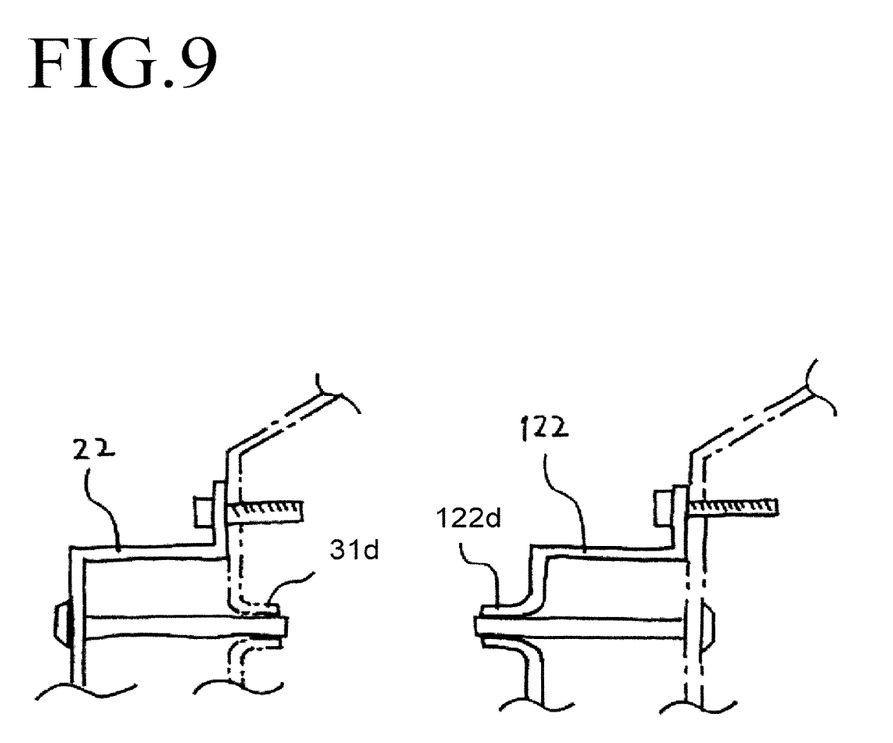
FIG. 9 is a side view illustrating the lock device of another example of the second embodiment.

In FIG. 9, at the receptacle holes, emboss contact portions 31d and 122d are formed for purpose of strengthening of contact portion and a secure load transmission.

Obviously, numerous modifications and variations of the present invention are possible in light of the above teachings. It is therefore to be understood that within the scope of the appended claims, the invention may be practiced otherwise than as specifically described herein.

We claim:

1. A vehicle seat lock device, comprising:
    a seat lock housing configured to be fixed to one of a seat back and a vehicle body;
    a striker configured to be fixed to the other of the seat back and the vehicle body;
    a hook member rotatably mounted on the seat lock housing to latch and unlatch the striker by engaging and disengaging the striker, respectively, the hook member including an engagement portion at one end that includes an incline portion that is on an outer circumferential surface of the engagement portion and wedge portion formed on an inner surface of the engagement portion; and
    a blocking member pivotally mounted on the seat lock housing, wherein
    the blocking member pivots and contacts with the hook member to prevent the hook member from rotating and to maintain engagement between the hook member and the striker when a load that is higher than a predetermined amount is inputted to the vehicle body, and
    the striker engages the inclined portion to latch the striker and the wedge portion hooks the striker in a latched position.

2. A vehicle seat lock device as claimed in claim 1, further comprising:
    a bias spring disposed between the seat lock housing and the blocking member, wherein the bias spring biases the blocking member to a standby position in which the blocking member does not make contact with the hook member, while a load lower than the predetermined amount is inputted to the vehicle body.

3. A vehicle seat lock device as claimed in claim 2, wherein:
    the bias spring allows the blocking member to pivot until the blocking member contacts with the hook member, when a load that is higher than the predetermined amount is inputted to the vehicle body.

4. A vehicle seat lock device as claimed in claim 3, wherein:
    the bias spring is a torsional spring.

5. A vehicle seat lock device as claimed in claim 1, wherein:
    the blocking member has a pendulum shape.

6. A vehicle seat lock device as claimed in claim 5, wherein:
the blocking member includes a round chamfer shape at a portion close to the hook member.

7. A vehicle seat lock device as claimed in claim 1, wherein:
the blocking member includes a round chamfer shape at a portion close to the hook member.

8. A vehicle seat lock device as claimed in claim 1, wherein:
the blocking member is integrally formed with a contact portion that contacts a stopper portion which is formed at the hook member.

9. A vehicle seat lock device as claimed in claim 1, wherein:
the hook member is integrally formed with a engagement portion that engages with the striker and with a stopper portion that contacts with a contact portion of the blocking portion, and
the engagement portion and the stopper portion are positioned on opposite sides of a rotational axis of the hook member.

10. A vehicle seat lock device as claimed in claim 9, wherein:
the blocking member includes a round chamfer shape at a portion close to the hook member.

11. A vehicle seat lock device as claimed in claim 1, wherein:
the load that is higher than a predetermined amount is caused by a higher acceleration than a predetermined amount.

12. A vehicle seat device as claimed in claim 1, wherein when the striker moves from an unlatched position to the latched position the striker contacts the incline portion to rotate the hook member in a first direction.

13. A vehicle seat device as claimed in claim 12, further comprising:
a spring that biases the hook member in a second direction opposite to the first direction,
wherein when the striker enters the latched position from the unlatched position the spring rotates the hook member in the second direction.

14. A vehicle seat device as claimed in claim 12, wherein the blocking member has no contact with the hook member in the latched position or in the unlatched position when the load inputted into the body of the vehicle is equal to or lower than the predetermined value.

* * * * *